United States Patent [19]

Reid, Jr.

[11] 4,427,104

[45] Jan. 24, 1984

[54] RADIAL STACKER

[75] Inventor: Edwin W. Reid, Jr., Prineville, Oreg.

[73] Assignee: Reid Bros., Inc., Prineville, Oreg.

[21] Appl. No.: 283,279

[22] Filed: Jul. 14, 1981

[51] Int. Cl.³ .............................................. B65G 41/00
[52] U.S. Cl. ..................................... 198/306; 198/313
[58] Field of Search ......................... 198/306, 313, 632

[56] References Cited

U.S. PATENT DOCUMENTS

| Re. 17,160 | 12/1928 | Barber | 198/306 |
| 3,552,546 | 1/1971 | Rath | 198/306 |
| 4,135,614 | 1/1979 | Penterman et al. | 198/306 |

Primary Examiner—Jeffrey V. Nase
Attorney, Agent, or Firm—Chernoff, Vilhauer, McClung, Birdwell & Stenzel

[57] ABSTRACT

A portable radial stacker includes a conveyor for transporting material along the length thereof. The conveyor is foldable, including a horizontal folding axis located at the top of the conveyor, an "A" frame located intermediate relatively folding portions of the conveyor, and an extensible motor whose ends are attached respectively to one of said relatively foldable conveyor portions and to said intermediate "A" frame, said motor being located medially between lateral sides of each of said portions of said conveyor.

7 Claims, 11 Drawing Figures

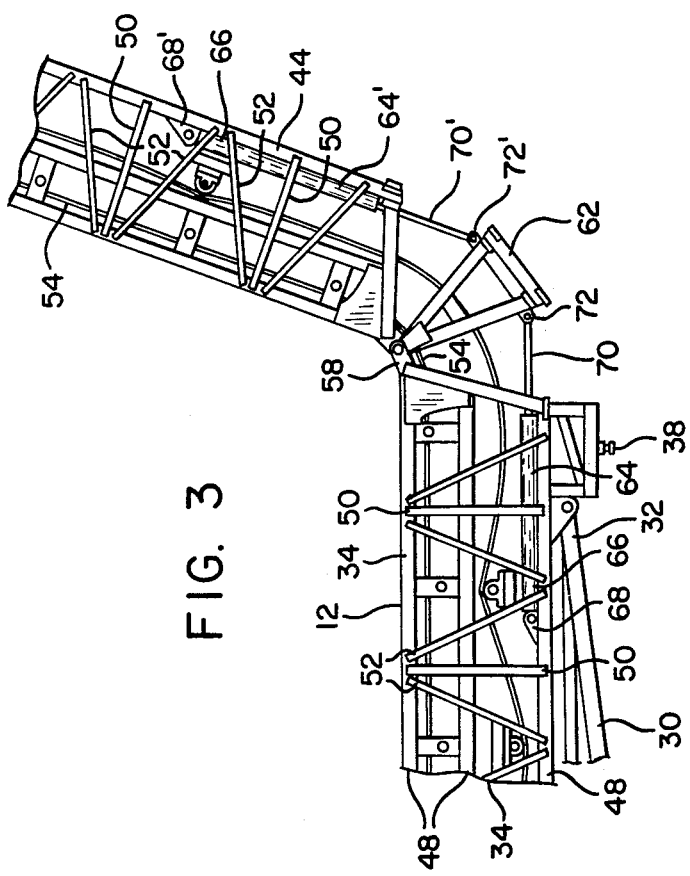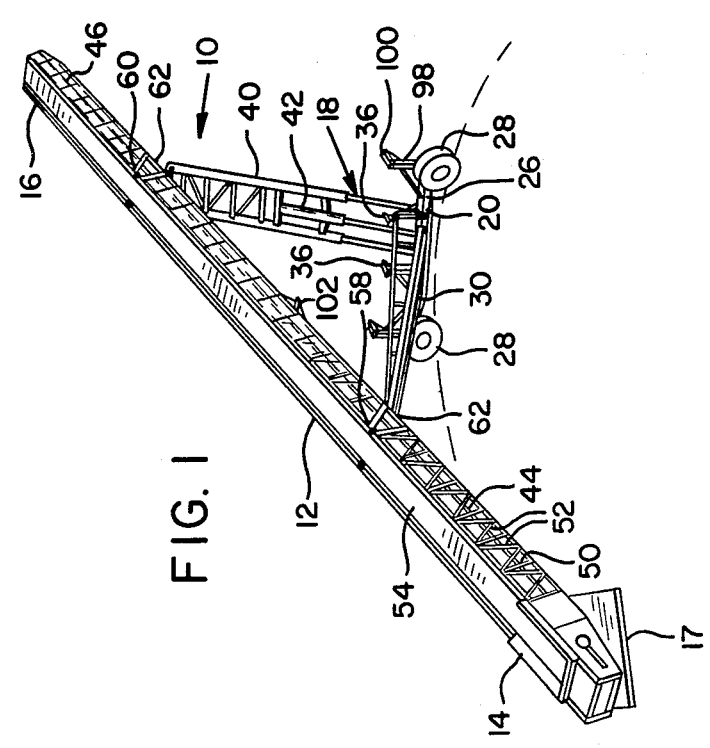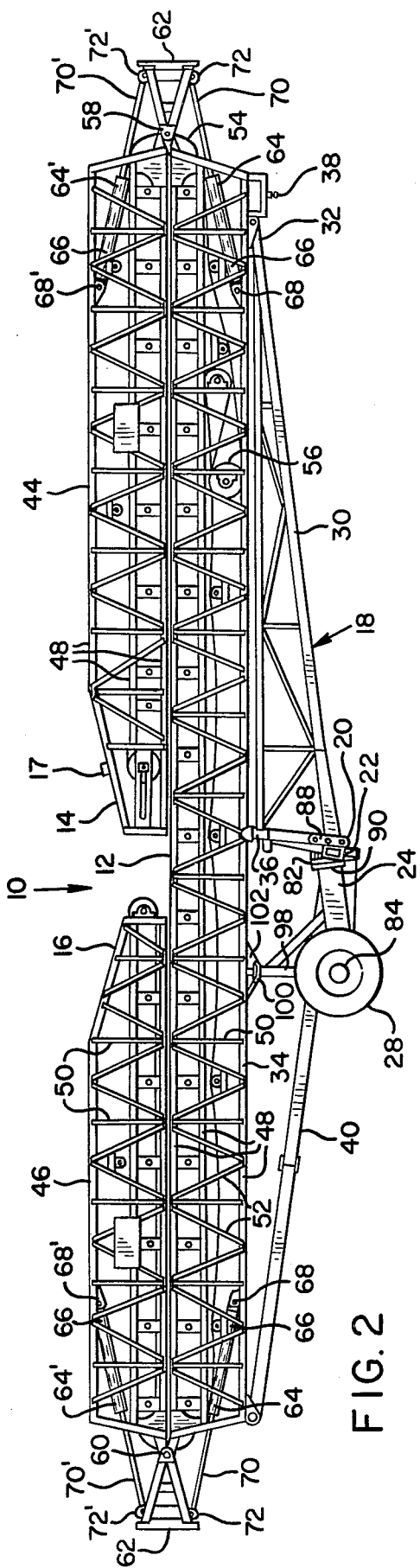

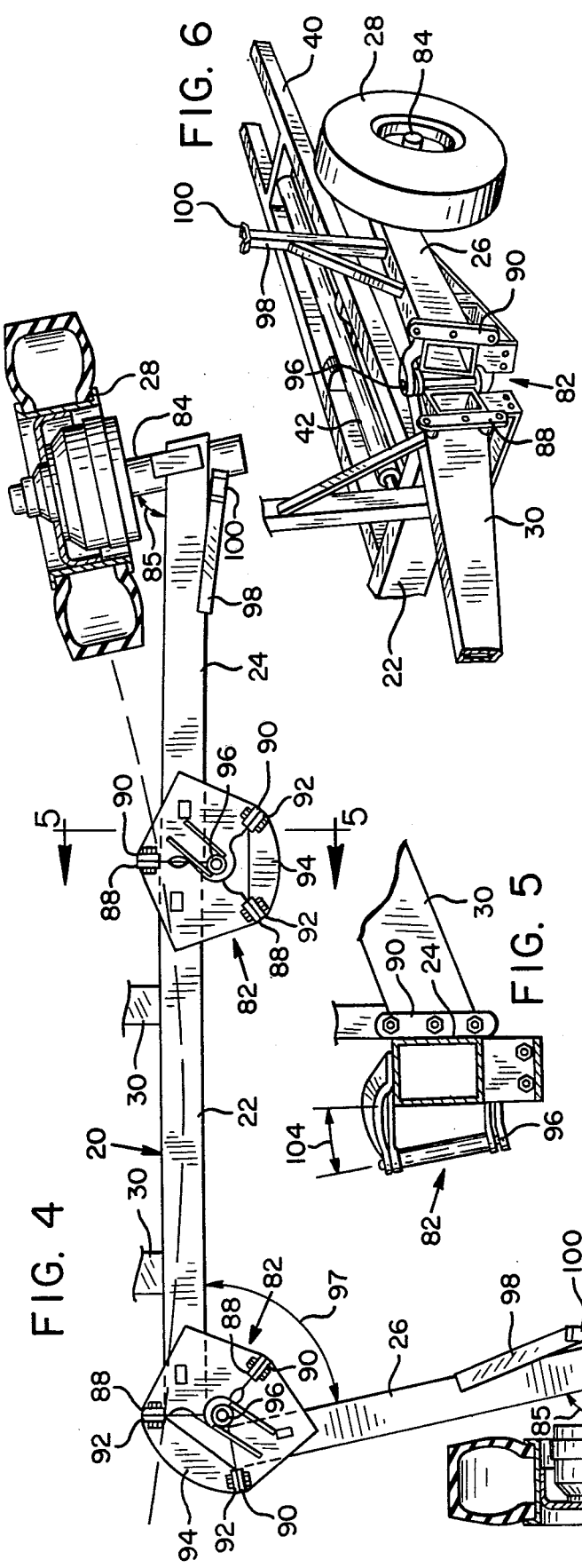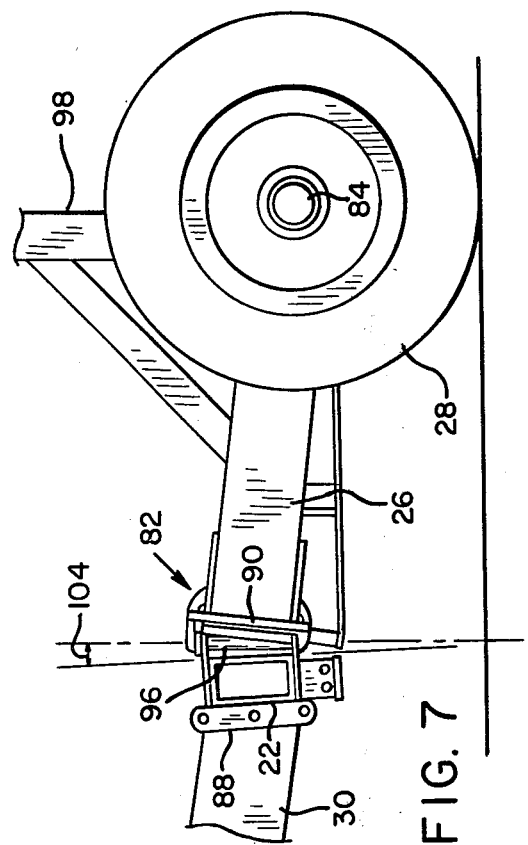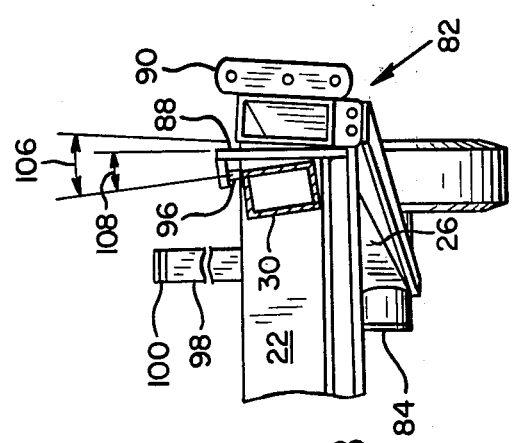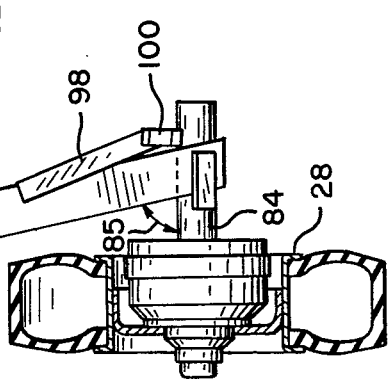

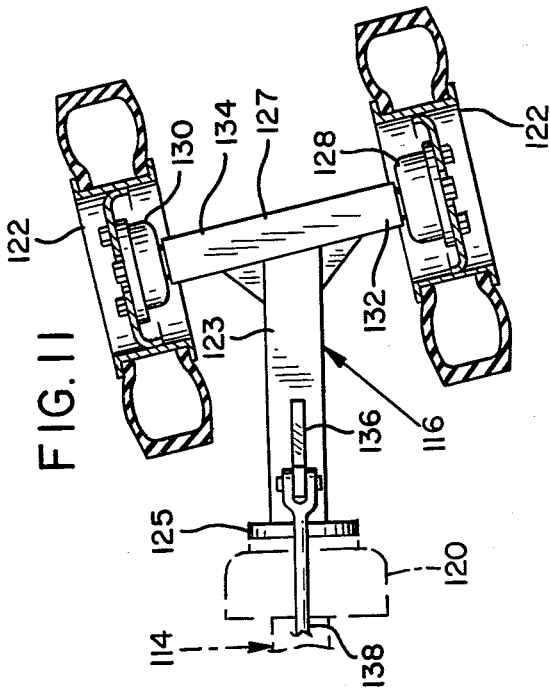

RADIAL STACKER

BACKGROUND OF THE INVENTION

The present invention relates to conveyors, and particularly to radial stackers which may be lowered and transported on highways, using their own wheels.

A radial stacker is a conveyor having a raised discharge end and an infeed end which is pivotally located at a central location. The stacker is movable about the central location to form an arcuate stack of material such as gravel and the like.

The desirability of providing a radial stacker which is easily transportable by highway has been clearly recognized in recent years. There are, however, several factors which make highway transportation of such conveyors somewhat difficult.

Because of their length and height radial stackers require a wide base resting on the ground to provide stability during operation. In the operating configuration, the lower or infeed end of the conveyor is pivotably located at a relatively fixed position, and the upper or discharge end of the conveyor is movably supported by wheels. These wheels are preferably spaced widely apart from the central longitudinal axis of the conveyor, to provide stability as well as support for the upraised conveyor. This width, however, often exceeds the maximum allowable width for highway operation of a vehicle.

The amount of material which can be stacked by a radial stacker is limited by the height of the upper or discharge end of the stacker, and by the distance to which the conveyor extends beyond the position of the wheels. It is therefore desirable to have a very long conveyor. This length, however, also often exceeds the maximum permissible length for highway transportability.

Various ways are known for reducing the overall width of radial stackers to provide for legal highway transport. For example, Penterman, et al., U.S. Pat. No. 4,135,614 discloses a portable radial stacker including a mechanism for swinging short outer end portions of its transverse axle assembly between an extended radial stacker operating configuration and a highway transport configuration. The axle assembly disclosed by Penterman et al., however, provides an unnecessarily limited width for the stacker in its operational configuration, as well as unnecessarily great overall width in the transport configuration.

Rath U.S. Pat. No. 3,552,546 discloses a radial stacker in which the main transverse axle member extends and contracts telescopically to change the width of the supporting structure between a wide operational width and a narrower highway transport width. This construction, however, is unnecessarily complex and expensive. A simpler, less expensive means for providing adjustable width is desired.

Other arrangements are known for realigning wheels from a transport configuration to a radial stacking configuration, as exemplified in Barber U.S. Pat. No. 17,160. However, arrangements of these types do not provide any additional width in the radial stacker configuration, and therefore do not provide the desired stability of the stacker during operation.

Another consideration in a transportable radial stacker is that the apparatus should remain stable during conversion from its operating to its transport configuration. This does not appear to have been directly addressed in previously known radial stackers.

Numerous arrangements are known for utilizing hydraulic piston and cylinder assemblies, or other motors, to reduce the length of an extremely long conveyor by folding portions of the conveyor reversely along other portions of the conveyor. Examples of such hydraulically powered conveyor folding arrangements are shown in Moy U.S. Pat. No. 3,051,295, Spellman, Jr., U.S. Pat. No. 3,493,136, Rossi U.S. Pat. No. 3,599,784, and Penterman et al. U.S. Pat. No. 4,135,614. In all of these mechanisms, however, the piston shaft of a hydraulic ram is exposed when the conveyor is in its operational configuration. As a result, the piston shaft is susceptible to being damaged when such a coveyor is used for handling abrasive materials such as sand and gravel.

The hydraulic motors used for folding conveyors are ordinarily employed in parts, with one hydraulic motor on each side of the conveyor, as disclosed by Penterman et al. Any imbalance between the forces provided by the hydraulic motors of a pair may cause undesirable wracking and twisting forces which could jam the folding mechanism involved. Additionally, the hydraulic motors and linkages connecting segments of such conveyors are often unprotected during use of the conveyors.

What is desired, therefore, is an improved transportable radial stacker apparatus whose structure is variable between a shortened narrow configuration which is legal for highway transport and an operating configuration providing an increased separation between the wheels supporting the conveyor in its raised position. Also desired is a mechanism for folding such a radial stacker to a reduced overall length which permits legal highway transport of the apparatus and in which the folding mechanism is protected when the stacker is in its operating configuration.

SUMMARY OF THE INVENTION

The present invention provides a highway transportable radial stacker including improved mechanisms for folding the conveyor from an extended configuration to a reduced length and for converting from a wide based configuration to a narrower configuration for highway transport.

In the radial stacker of the present invention the conveyor includes a central portion and end portions connected thereto by hinge joints each having a horizontal transverse pivot axis. An "A"-shaped intermediate lever arm element is located between the central portion of the conveyor and each end portion and can rotate on the same hinge joint pivot axis. A double acting hydraulic ram or other extensible and contractible motor is located within the frame of each of the conveyor sections, with one end pivotably connected to the interior of the frame of the conveyor section and the other end pivotably connected to the "A"-shaped intermediate lever arm element.

When the conveyor is extended in its operational configuration each of the hydraulic rams is fully retracted and its piston shaft is protected within the ram cylinder. Extension of the hydraulic ram lifts the conveyor end portions relative to the intermediate element, rotating them about the hinge joints, placing the end portions of the conveyor in an oppositely oriented position atop the central portion.

Reduction of width of the portable radial stacker may be accomplished by either of two alternative mechanisms. The first mechanism includes a central horizontal transverse axle member and a swing axle member attached at each end thereof. A stub axle is connected to each swing axle at an angle less than 90 degrees. A pivotable joint permits the swing axle member to be swung more than 90 degrees from the operating configuration to a transport configuration. In the operating configuration the swing axles extend directly in line with the central transverse horizontal axle member, providing a wide base to support the radial stacker. In the transport configuration the wheels are located close together behind the central transverse axle member and are oriented for rotation about an axis perpendicular to the length of the conveyor.

In a second embodiment of the radial stacker of the invention a transverse horizontal axle member is provided with a hub for receiving dual wheels in a configuration having an overall width narrow enough for legal highway transportation. A generally "T"-shaped adapter can be bolted to the hub on each end of the main transverse axle member in place of the dual wheels, with the vertical member of the "T" extending in line with the axle member. A rotatable hub is provided at the end of each arm of the crossbar of the "T"-shaped adapter. The crossbar of the "T" meets the vertical member of the "T" in an angle such that the crossbar extends along a radial line from the pivot point of the lower end of the conveyor when the stacker is in its operational configuration.

It is therefore a primary objective of the present invention to provide an improved transportable radial stacker.

It is another objective of the present invention to provide a radial stacker in which the conveyor may be lowered and folded to a shorter length and the wheels are movable to a narrower width permitting legal transportation of the radial stacker by highway.

It is a further objective of the present invention to provide a radial stacker having ample stability in an operating configuration.

It is a principal feature of the present invention that it includes a folding axle assembly including an axle pivot axis which is inclined to permit portions of the axle to be swung from an extended colinear alignment to relatively closely spaced positions with the wheels of the stacker remaining close to the ground during the transition from the operating configuration to the transport configuration.

It is another important feature of the invention that the movable swing axle members can be swung to a position partially beneath a portion of the conveyor, allowing the wheels to be moved closer together than has been possible in previously known radial stackers of this type.

It is another important feature of the present invention that it provides a "T"-shaped adapter usable to increase the width of the stacker from a highway transportable configuration to a radial operating configuration.

It is yet a further feature of the invention that it provides an uncomplicated conveyor-folding mechanism in which extensible motors used to fold the conveyor are protected when the conveyor is in its operational configuration.

It is a primary advantage of the present invention that it provides a conveyor folding mechanism which is more reliable than previously known folding mechanisms for conveyors of this type.

It is another important advantage of the present invention that it provides a highway transportable radial stacker having greater stability in an operating configuration than previously known highway transportable radial stackers.

It is a further advantage of the present invention that it provides a highway transportable radial stacker having a greater variation in wheel spacing between its narrow transport configuration and the operating configuration of the stacker.

BRIEF DESCRIPTION OF THE DRAWINGS

FIG. 1 is a pictorial view of a portable radial stacker embodying the present invention.

FIG. 2 is a side elevational view of the portable radial stacker shown in FIG. 1, in a lowered, highway transportable configuration.

FIG. 3 is a side elevational view of a detail of the radial stacker shown in FIGS. 1 and 2, showing the mechanism for folding the conveyor portion of the stacker.

FIG. 4 is a top plan view of the folding axle assembly of the portable radial stacker shown in FIG. 1.

FIG. 5 is a side elevational sectional view, at an enlarged scale, of a detail of the folding axle shown in FIG. 4, taken along line 5—5.

FIG. 6 is a pictorial view of a detail of the radial stacker of FIG. 1, showing the folding axle assembly shown in FIG. 4.

FIG. 7 is a side elevational view of the folding axle assembly shown in FIG. 4.

FIG. 8 is a front elevational view, at an enlarged scale, of a detail of the folding axle arrangement shown in FIG. 4.

FIG. 9 is a pictorial view of a portable radial stacker which is an alternative embodiment of the present invention.

FIG. 10 is a rear elevational view of the axle arrangement of the portable radial stacker of FIG. 9, at an enlarged scale.

FIG. 11 is a bottom plan view of one of the "T"-shaped adapters which are part of the axle arrangement shown in FIG. 10.

DETAILED DESCRIPTION OF THE INVENTION

Referring first to FIGS. 1-3 of the drawings, a portable radial stacker 10 shown in FIG. 1 comprises an elongate conveyor 12 having a front or infeed end 14 and a rear or discharge end 16. A carriage 18 supports the conveyor 12 and is convertible between an operating configuration in which the discharge end 16 of the conveyor 12 is raised and the stacker is pivotable about a pivot point 17 at the infeed end 14, and a transport configuration in which the conveyor 12 is lowered to approximately a horizontal orientation. The carriage 18 includes an axle assembly 20 made up of a reinforced rectangular box-shaped transverse central axle member 22 and a pair of swing axles 24 and 26 of similar construction pivotably attached thereto and movable between a laterally extended operating configuration (FIG. 1) and a rearwardly folded transport configuration shown in FIG. 2. Wheels 28 are rotatably mounted on the swing axles, and hydraulic motors (not shown) are provided to drive the wheels 28 when the stacker 10 is in the operating configuration.

A forward frame 30 portion of the carriage 18 is fixedly attached to the central axle member 22 and pivotably attached at its forward end 32 to the bottom of the elongate main portion 34 of the conveyor 12. A saddle 36 is provided at the top of the forward frame 30, above the central axle member 22, to support the conveyor 12, and a fifth wheel pivot pin 38 is provided at the forward end of the elongate main portion 34, for towing the radial stacker 10 in the transport configuration. A rear support leg 40 is pivotably attached to both the central axle member 22 and the bottom of the elongate central portion 34, at the rear end thereof. The rear support leg 40 is extensible by means of a hydraulic cylinder and piston assembly 42 to raise the conveyor 12 from the transport configuration to the operating configuration.

The conveyor 12 may be folded to a reduced overall length when the carriage 18 is lowered to the transport configuration by contraction of the hydraulic cylinder and piston assembly 42. Elongate infeed and discharge end portions, 44 and 46 respectively, of the conveyor 12 each fold to a position parallel with the elongate main portion 34 of the conveyor 12 and are then supported atop the elongate main portion 34.

Each of the main and end portions 34, 44 and 46 of the conveyor 12 comprises a frame having preferably six longitudinal rails 48. The longitudinal rails 48 are interconnected at intervals by horizontal cross members (not shown) and interconnecting vertical braces 50 and diagonal wind braces 52.

Material is moved by the radial stacker 10 on a flat endless belt 54 loopingly extending through the conveyor 12 from end to end between the longitudinal rails 48 and driven by a suitable motor and a drive roller 56. The upper surface of the endless belt 54 is preferably located below the height of the top ones of the longitudinal frame rails 48, thus being somewhat shielded from the effects of wind and avoiding interference when the end portions 44 and 46 are folded back atop the main portion 34. Conventional rollers extend transversely between the longitudinal rails 48 of the conveyor 12 to support the conveyor belt 54 and the load carried thereon.

The elongate end portions 44 and 46 of the conveyor 12 are connected with the main portion 34 of the conveyor by respective hinge joints 58 and 60, each including a transverse horizontal pivot axis which interconnects the main portion 34 of the conveyor 12 with the respective end portion 44 or 46 and an "A"-shaped intermediate lever arm member 62. The hinge joints 58 and 60 each pass through the top of the "A" shape of the respective one of the intermediate lever arm members 62, while each leg of the "A" lies alongside the respective ends of the elongate central portion 34 and elongate end portions 44 and 46, to which the intermediate lever arm member 62 may be bolted to maintain rigidity of the conveyor 12 in its operating configuration.

Extensible motors 64, for example double acting hydraulic piston-and-cylinder assemblies, each have their cylinder end 66 pivotably connected to a mounting point 68 between the lowest longitudinal rails 48 of the elongate main portion 34 of the conveyor 12 and the other, extensible, end 70 pivotably connected to an attachment point 72 on the "A"-shaped intermediate lever arm member 62. Similarly, other extensible motors 64' are pivotably attached to other mounting points 68' within the elongate infeed end portion 44 and discharge end portion 46 of the conveyor 12 and have their extensible ends 70' pivotably connected to attachment points 72' on the respective intermediate lever arm member 62.

Each of the extensible motors 64 and 64' is centered laterally within a respective elongate portion of the conveyor 12, where the frame members 48, 50, and 52 provide protection against damage to the extensible motor. This location also permits use of larger hydraulic motors which therefore require lower pressure.

Furthermore, it will be noted that when the conveyor 12 is fully extended in the operating configuration, each of the extensible motors 64 is contracted, so that the piston shaft of the hydraulic piston and cylinder assembly is retracted within the cylinder and thus is protected from abrasion by gravel or sand being handled by the stacker of the invention.

Referring now to FIGS. 4–6, the axle assembly 20 of the carriage 18 is shown in greater detail. In FIG. 4 it may be seen that the central axle member 22 includes a reinforced axle pivot assembly 82 at each of its ends, connecting a respective swing axle 24 or 26 to each end of the central axle member 22. A stub axle 84, having one of the wheels 28 rotatably mounted thereon, is attached to each swing axle. The stub axles 84 are mounted on each of the swing axles 24 and 26 at a non-perpendicular angle 85 so that each stub axle extends along a radius from the pivot point 17 of the infeed end 14 of the stacker 10 when the stacker 10 is in the operating configuration.

Flanges 88 are provided on the central axle member 22, flanges 90 are located on the swing axles 24 and 26, and flanges 92 are located on a movable brace member 94, to limit the available range of motion of the swing axles 24 and 26 about the axle pivot axis 96 of each pivot assembly 82. In the rearwardly rotated position of the swing axles 24 and 26 the stub axles 84 are aligned coaxially with each other, providing a straight-ahead orientation of the wheels 28. The swing axles 24 and 26 then extend convergently rearwardly, thus bringing the wheels closer to one another than the distance between the axle pivot axes. This permits the main axle member to be nearly as long as the maximum permitted transport width, while also permitting the wheels to be located within the maximum legal width for transport. Rearward location of the wheels 86 transfers a substantial amount of the weight of the radial stacker 10 forward to be carried by a truck tractor during highway transport.

On the other hand, when the swing axles 24 or 26 are extended to their position coaxial with the central axle member 22 the greater lengths of the central axle member 22 and the swing axles are combined, providing a broad, stable base to support the conveyor in its raised operating configuration. The flanges 90, 92 and 94 may be bolted together to join the swing axles strongly to the central axle member, in either position of the swing axle 24 or 26.

For example, the flanges 90 and 92 may permit the swing axles each to swing through a horizontal angle of 100° while the central axis of the stub axle 84 defines an angle 85 of 80° with the swing axle member 24 or 26. When the swing axles 24 and 26 are in the laterally extended operating configuration position the wheels 28 are aligned to rotate about an axis extending horizontally toward the pivot point 17 of the infeed end 14 of the radial stacker, allowing the discharge end 16 of the radial stacker 10 to be moved along an arcuate path while the infeed end 14 remains substantially stationary to receive materials such as gravel being discharged from a crusher and distribute the materials into an arcuate stack.

As shown particularly in FIGS. 5 and 7 it will be noted that the axle pivot axis 96 is inclined rearwardly and the rectangular box shape of the axle assembly 20 is upright as seen from the side, when the conveyor 12 is in its raised operational configuration, but tilted ahead when the conveyor 12 is in the horizontal transport configuration. Also, when viewed from ahead as in FIG. 8 the tops of the axle pivot axes 96 will be seen to be inwardly inclined. This inclination of the axle pivot axes 96 permits each swing axle 24 or 26 to be moved between its rearwardly folded position and the laterally extended position by raising the end of the main axle member only slightly, when the stacker carriage 18 is in its lowered, transport configuration and the conveyor main portion 34 is horizontal. As the swing axle 24 or 26 is rotated between the rearwardly folded position and the laterally extended position the wheels remain a uniform distance above the ground, reducing the danger of damage should the apparatus supporting the central axle member 22 fail.

Support arms 98 having saddles 100 at their top ends extend vertically from each of the swing axles 24 and 26 to reinforced supports 102 on the lower side of the conveyor 12 (FIG. 2), transferring some of the weight of the conveyor 12 to the swing axles 24 and 26 and relieving the axle pivot assemblies 82 of torsional stress when the stacker 10 is in the transport configuration.

The radial stacker 10 of the present invention is preferably converted from the operating configuration to the transport configuration by first folding the elongate discharge end portion 46 to its transport position atop the elongate main portion 34 of the conveyor 12 by extending the respective extensible motors 64 and 64', forcing the intermediate lever arm 62 away from both the main portion 34 and the elongate discharge end portion 16 causing the discharge end portion 46 to rise and then fold downward to a position parallel with and atop the elongate main portion 34 of the conveyor. It will be appreciated that the extensible motors 64 must be capable of applying force in either direction in order to control the movement of the elongate end portion 44 or 46 being folded and to enable unfolding the elongate end portions from their positions atop the elongate main portion 34.

Once the elongate discharge end portion 46 has been folded, the rear support leg 40 may be lowered by retracting the hydraulic cylinder-and-piston assembly 42 until it is a short distance from its fully retracted position, leaving sufficient room for the support arms 98 to move beneath the supports 102. Next the forward end of the conveyor 12 is raised until the elongate main portion 34 of the conveyor is horizontal, at which time the ends of the central axle member 22 may be lifted slightly in turn and the associated swing axle 24 or 26, after the associated flanges 90, 92 and 94 are unbolted, may be swung rearwardly. As each swing axle 24 or 26 is rotated rearwardly the associated wheel 28 will remain at essentially the same distance above the ground, and the swing axle will rotate from a forwardly tilting orientation to a nearly upright attitude which provides a slight amount of camber and allows for a small amount of torsion of the swing axle during transport of the radial stacker 10. Once both swing axles 24 and 26 have been rotated to the rearwardly extending position the rear support leg 40 may be lowered completely until the supports 102 rest in the saddles 100 of the support arms 98 transferring part of the weight of the conveyor 12 downward to the swing axle 24 or 26. This will also bring the elongate main portion 34 to rest on the saddle 36 of the forward frame 30.

In an exemplary radial stacker 10 whose conveyor 12 is 104 feet in length when fully extended, the central axle member 22 is 6 feet, 6 inches long between axle pivot axes 96 and each swing axle 24 or 26 is 5 feet, 8 inches long from the pivot axis 96 to the center of the stub axle 84. The central axle member 22 is inclined approximately 10° forward when the elongate infeed end portion 14 and discharge end portion 16 are folded and the main portion 34 of the conveyor is horizontal, with the rear support leg 40 retracted to the transport position. The pivot axis, as seen in side elevational view (FIG. 5) is inclined rearwardly with respect to the central axle member 22 by an angle 104 of 5° 20'. It is inclined inwardly as seen in front elevational view (FIG. 8) by an angle 106 of 3° 41' and inclined with respect to the swing axle by an angle 108 of 4° 6' with the swing axle forming an angle 97 (FIG. 4) of 80° with respect to the central axle member 22. The small difference between the angles 106 and 108 provides for a slight amount of torsion in the swing axle 24 or 26, as well as a slight amount of camber.

Referring to FIGS. 9-11, an alternative embodiment 110 of the radial stacker of the present invention may be seen to comprise a carriage 112 having a transverse main axle member 114 and a pair of "T"-shaped adapters 116 providing a wide stable supporting base for the conveyor 118 when it is in its raised radial stacking operating configuration. The main axle member 114 has a pair of hubs 120 including brakes, for receiving a pair of dual wheels 122 in the transport configuration.

Each "T"-shaped adapter 116 includes a base member 123 having a flange 125 at its inner end and a crossbar 127 at its outer end. As may be seen in FIG. 10, each "T"-shaped adapter 116 may be bolted to the flange 124 of the hub 120 located at the respective end of the main axle member 114.

All of the bolts 126 are provided with left hand threads on one end of the main axle member 114 and right hand threads at the opposite end. The bolts 126 ordinarily used to hold the inner dual wheel 122a to the hub flange 124 may be used to hold the base flange 123 of "T"-shaped adapter 16 to the hub 120, while the bolts 124 ordinarily used to hold the outer dual wheel 122b to the inner dual wheel 122a and its hub 120 may then be used to hold each of the dual wheels 122 in place on a respective pivoted hub 128 or 130 on the arms 132 and 134 of the crossbar 127 of the "T"-shaped adapter. As a result all of the bolts 126 are used and sufficient strength is provided for supporting the stacker 110 in its raised operating configuration, where the stresses felt by the wheel bolts 126 are less than those experienced during highway transportation of the radial stacker 110.

Since each adapter 116 is mounted on a flange 124, which is rotatably connected through the hub 120 to the main axle member 114, the arms 132 and 134 of each adapter can move up and down to accommodate unevenness of the ground where the stacker 110 is being used. The vertical movement of the hub 120 on the main axle member 114 is reduced to only a fraction of the vertical movement of the individual wheels 112 mounted on the hubs 128 and 130.

The length of the "T" bar adapter 116 naturally changes the type of stress experienced by the bearings of the hubs 120 on the ends of the main axle member 114, greatly increasing the magnitude of the moment tending to rotate the outer ends of the hubs 120 upwardly about an imaginary horizontal axis extending longitudinally of the stacker. To counteract this moment a lever arm 136 is provided on the bottom of each "T"-shaped adapter, and a tensioning member 138 interconnects the levers to counteract the moment created the upward force of the wheels 122 and the downward force of the weight of the radial stacker 110. In a preferred embodiment, as seen in FIG. 10, the tensioning member 138 comprises a pair of truss rods 140 interconnected by a turnbuckle 142 located centrally beneath the main axle member 114.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A highway transportable radial stacker, comprising:
   (a) an elongate conveyor having an elongate main portion and at least one elongate end portion hingedly interconnected therewith;
   (b) wheeled carriage means for transporting said conveyor, said carriage means including means for holding said conveyor in either a raised operating configuration or a lowered transport configuration of said stacker;
   (c) a set of wheels and variable-width means for selectively positioning said wheels in either a widely spaced operating configuration or a closely spaced transport configuration; and
   (d) at least one folding mechanism means for selectively moving a respective elongate end portion of said conveyor between an extended position coaxial with said elongate main portion thereof and a folded position generally parallel with and adjacent to said elongate main portion thereof, said folding mechanism means including an intermediate lever arm located between said elongate main portion and said respective elongate end portion, said intermediate lever arm having first and second ends, said first end of said intermediate lever arm being pivotably interconnected with at least one of said elongate main portion and said respective elongate end portion, said folding mechanism means further comprising a pair of extensible motor means, one of said extensible motor means interconnecting said main portion and said second end of said intermediate lever arm and the other of said extensible motor means interconnecting said respective elongate end portion and said second end of said intermediate lever arm, for pivoting said elongate end portion with respect to said main portion.

2. The radial stacker of claim 1 wherein each extensible motor means is located laterally substantially centrally within the respective elongate portion of said conveyor.

3. The radial stacker of claim 1 wherein said intermediate lever arm has an "A" shape and is pivotably connected to said at least one of said main portion and said respective end portion at the apex of said "A" shape, said extensible motor means being pivotably connected with respective legs of said "A" shape.

4. The radial stacker of claim 1 wherein said variable-width means comprises a transverse central axle member and a pair of swing axles, said conveyor having a discharge end which is raised relative to an infeed end when said stacker is in said operating configuration, and each of said swing axles having means for holding a wheel rotatably mounted thereon, each of said swing axles being pivotably connected to said central axle member by an axle pivot joint, and each of said axle pivot joints having inclined means for permitting said swing axle to move with said wheel remaining at substantially a constant height, from a position colinear with said central axle member to a rearwardly extending position in which said wheel has a predetermined amount of camber when said conveyor is in said transport configuration.

5. The radial stacker of claim 4 wherein each of said swing axles includes an outer end, said outer ends converging toward one another and said wheels being closer to each other than the distance between the ends of said horizontal central axle member when said stacker is in said transport configuration.

6. The radial stacker of claim 4 wherein said horizontal central axle member is substantially upright when said conveyor is in said operating configuration and is inclined forwardly when said conveyor is in said transport configuration.

7. The radial stacker of claim 1, said variable-width means comprising a transverse main axle member having first spindle and hub means located at each end thereof for receiving respective wheels in a transport configuration of said stacker, and a pair of "T"-shaped adapters, each of said adapters having a base and a pair of arms and including means on said base for fastening a respective one of said adapters to each of said first spindle and hub means in place of a wheel, and second spindle and hub means located on each arm of said "T"-shaped adapter for rotatably attaching a respective wheel to each one of said arms of each of said "T"-shaped adapters, in an operating configuration of said radial stacker.

* * * * *

UNITED STATES PATENT AND TRADEMARK OFFICE
CERTIFICATE OF CORRECTION

PATENT NO.   :   4,427,104

DATED        :   January 24, 1984

INVENTOR(S)  :   Edwin W. Reid, Jr.

It is certified that error appears in the above-identified patent and that said Letters Patent is hereby corrected as shown below:

Col. 1, line 61, after "Patent No." insert --RE--.

Col. 2, line 19, change "parts" to read --pairs--.

Col. 2, line 64, change "ram" to read --rams--.

Signed and Sealed this

Ninth Day of April 1985

[SEAL]

Attest:

DONALD J. QUIGG

Attesting Officer  Acting Commissioner of Patents and Trademarks